(12) United States Patent
Wannke et al.

(10) Patent No.: US 6,463,018 B1
(45) Date of Patent: *Oct. 8, 2002

(54) PLATE-LIKE OPTICAL STORAGE MEDIUM AND READING DEVICE

(75) Inventors: Dietmar Wannke, Reutlingen; Harald Bochmann, Hannover; Andreas Vahle, Hildesheim, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,006

(22) PCT Filed: Nov. 8, 1997

(86) PCT No.: PCT/DE97/02616

§ 371 (c)(1),
(2), (4) Date: Jul. 21, 1999

(87) PCT Pub. No.: WO98/33175

PCT Pub. Date: Jul. 30, 1998

(30) Foreign Application Priority Data

Jan. 23, 1997 (DE) ......................................... 197 02 245

(51) Int. Cl.⁷ ................................................ G11B 7/00
(52) U.S. Cl. .................................... 369/44.11; 235/454
(58) Field of Search ........................... 369/44.14, 44.18, 369/44.13, 44.11, 44.28, 97, 44.21, 44.22; 235/454, 456, 458–467, 470–481, 485, 487, 484, 486

(56) References Cited

U.S. PATENT DOCUMENTS 5,748,600 A * 5/1998 Sugano et al. ........... 369/44.18

FOREIGN PATENT DOCUMENTS

| DE | 42 25 727 A1 | 2/1994 |
| DE | 43 11 683 C2 | 5/1996 |
| EP | 0666565 A2 * | 8/1995 |
| GB | 2169119 A * | 2/1986 |

* cited by examiner

*Primary Examiner*—Thang V. Tran
(74) *Attorney, Agent, or Firm*—Michael J. Striker

(57) ABSTRACT

An optical storage medium and a reading device are proposed, wherein the optical storage medium has the format of a credit card.

4 Claims, 2 Drawing Sheets

PLATE-LIKE OPTICAL STORAGE MEDIUM AND READING DEVICE

BACKGROUND OF THE INVENTION

The invention is based on a plate-shaped, optical storage medium and reading device.

A plate-shaped, optical storage medium has been disclosed by German Patent Document 4311683. These storage mediums which are generally referred to as CDs (compact disc) contain binary data which are stored serially in a sequence of heights and depths along a spiral track. The CD is embodied as a round disc upon which the spiral track goes from the inside to the outside. For scanning, the disc is set into a circular rotational motion, wherein in order to achieve a constant data flow density, the rotation speed decreases during a scan from the inside toward the outside.

A CD reading device has been disclosed, for example, by German Disclosure Document 4225727. In order to scan the CD, the laser diode, whose light is reflected on the surface of the CD, is moved radially over the CD which is rotating at different speeds.

EP-A-0 666 565 has disclosed a reading device for reading an optical card, which includes an optical reading head with a laser diode and optical lenses for focusing the laser beam. The optical reading head also includes an optical sensor for detecting the reflected laser beam. The optical card rests on a spacer ring, which assures a certain distance between the objective lenses of a rotary plate and the optical card. The rotary plate with the objective lenses of the scanning head is set into rotation in order to optically scan the optical card.

U.S. Pat. No. 4,656,346 has disclosed an optical system for reading an optical card in credit card format. The optical system includes a laser light source, which emits a laser beam that passes through focusing optics. Furthermore, there are known detectors which detect the laser beam that is held by movable retention device. The laser beams follow the tracks of the optical storage card by virtue of the fact that the retention device is moved in the longitudinal direction of the card in relation to the laser beams.

SUMMARY OF THE INVENTION

The plate-shaped, optical storage medium according to the invention has the advantage over the prior art that it has a small, convenient format, which has the shape and size of a standard card according to ISO 7810. The optical storage medium according to the invention provides a small exchangeable storage medium which can be inexpensively manufactured and is not sensitive to environmental influences. Therefore primarily, it can be used very easily in mobile devices, for example in a motor vehicle. It is particularly advantageous that despite the small dimensions of the storage medium, a large quantity of data can be stored.

An advantageous improvement and update of the storage medium is possible by means of the measures taken in the dependent claims. The storage volume can be advantageously doubled by using both sides of the storage medium.

The data are written along tracks which are disposed either parallel or perpendicular to the longitudinal axis of the card. As a result, the data can be read without the card according to the invention having to be set into rotation in the reading device as was previously the case with conventional storage plates.

The reading device according to the invention for reading the plate-shaped, optical storage medium in the standard card format advantageously has a suitable opening for receiving the optical storage medium as well as at least one laser diode for reading the data. The reading device does not require a motor that sets the optical storage medium into a rotating motion and does not require a movable scanning head which moves really over the surface of the storage medium. The reading device consequently has significantly fewer components since movements of the storage medium itself are eliminated.

The reading device advantageously has at least one laser diode, whose light follows the track of the storage medium. It is advantageous that for a very rapid reading potential, a laser array is installed in which a number of laser diodes simultaneously emit light and can detect data by using the interference process.

Advantageously, the beam of the laser diode follows the track of the storage medium by means of an optical device wherein this device can be a movable mirror or an electrooptical component.

In another embodiment of the reading device, a mechanical movement of the scanning head in the plane over the storage plate is advantageous in order to prevent a large deflection angle of the beam away from the perpendicular to the storage surface.

BRIEF DESCRIPTION OF THE DRAWINGS

An exemplary embodiment of the invention is represented in the drawings and will be explained in detail in the subsequent description.

DESCRIPTION OF THE PREFERRED EMBODIMENTS

Figure 1:
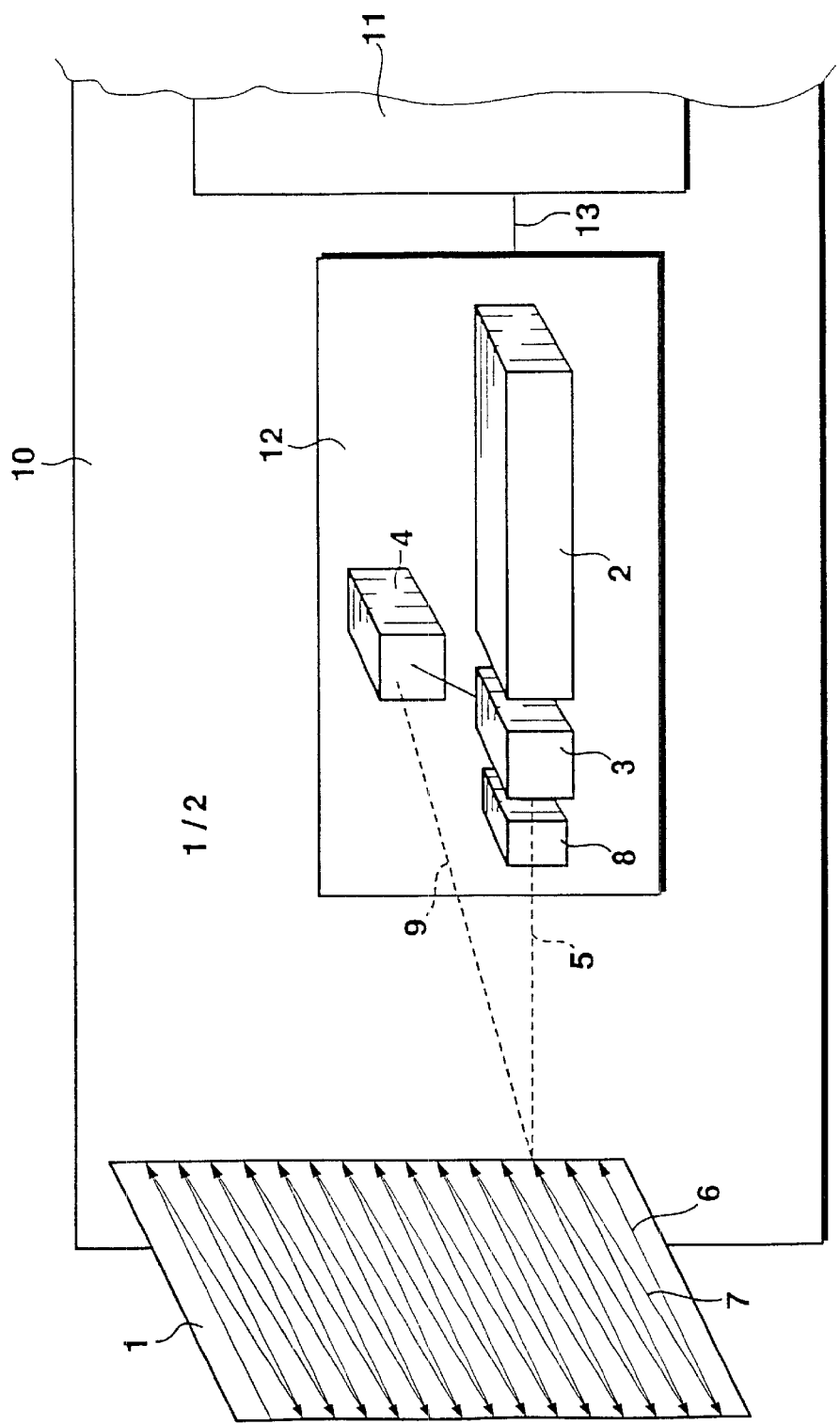
FIG. 1 shows an optical storage medium according to the invention with a reading unit.

FIG. 1 shows the plate-shaped storage medium 1 according to the invention, which has the format and size of standard cards according to ISO 7810. It is written with binary data along the track 6. The reading device 10 according to the invention has a scanning head 12 with a laser 2, a focusing unit 3, a deflection unit 8, and a receiving unit 4. The decoder 11 is connected to the scanning head 12 by way of the signal output 13. The laser beam 5 is reflected against the surface of the storage medium 1 into the beam 9 and is projected onto the receiving unit.

The storage medium 1 that is embodied as a storage card has a smooth, optical surface, upon which digital data are stored serially by means of a sequence of heights and depths. In the example of FIG. 1, the data tracks 6 are disposed perpendicular to the card longitudinal axis. The disposition of the data lines can also be carried out parallel to the card longitudinal axis. In a first exemplary embodiment, the scanning of the data lines 6 is executed by a respective placement of the laser beam 5 on the card edge. The laser beam 5 is guided diagonally 7 between the end point of the currently read track and the beginning point of the next track to be read. No data is recorded in the line return 7. The provision is also made that the scanning takes place by way of a continuous motion along the lines with a stroke into the next line, without the reading process having to be stopped. The scanning head 12 emits the laser beam 5, which is first focused onto the surface of the storage plate by the. focusing unit 3. The deflection unit 8, which can for example contain a number of mirrors, is connected in order to cause the beam follow the track on the storage card. In the scanning of an optical card of the size of a credit card, excessive deflection angles of the beam away from the perpendicular to the storage surface do not occur. As a result, other suitable optical components can also be used for deflecting the laser beam or for focusing and deflecting. The reflected beam is received and evaluated in the detector 4. The signal 13 is supplied to the decoder 11, which decodes the digital data and prepares it for further processing.

If the storage density of known CDs is used as a basis, high storage densities of up to 260 MB can be achieved with the storage card according to the invention. The storage medium can be used for various portable devices.

Figure 2:
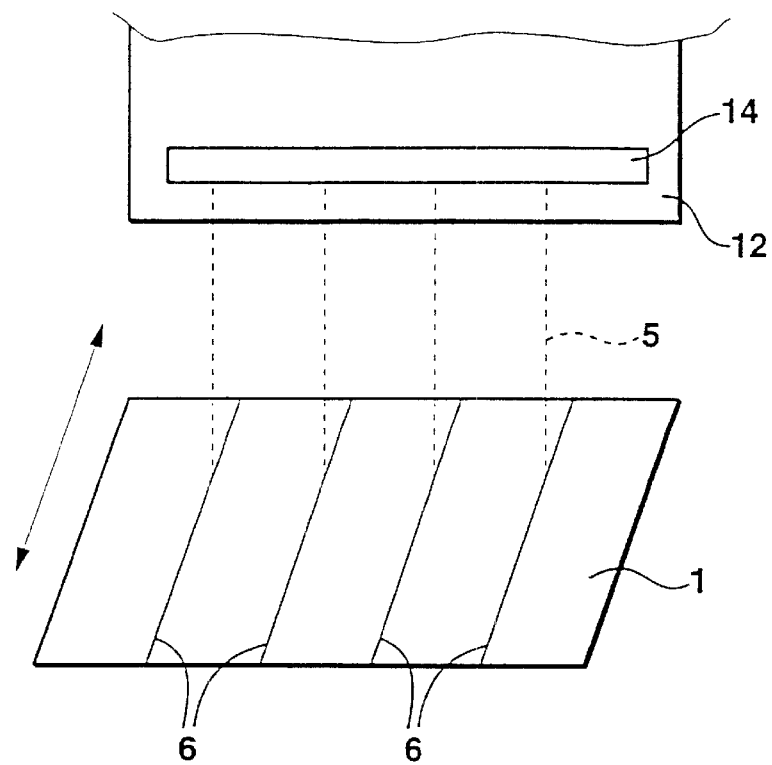
FIG. 2 shows a reading device with a laser diode array.

FIG. 2 shows the storage card 1 with the tracks 6 of binary data. The scanning head 12 includes a laser diode array 14, which emits laser beams 5.

If the intent is to reduce the access time for reading the optical card according to the invention, it is possible to use a number of laser diodes in the form of a laser diode array 14. Each beam 5 of a diode is focused on a respective track 6 of the card 1 and is only deflected along this track in the arrow direction. This eliminates deflection units that have to deflect the laser beam by a large angle and in two-dimensional fashion. The reading of data can therefore also occur in parallel fashion, when the further processing is assured.

If the evaluation of the data of the storage medium should be impaired by the attendant acute angle of the laser beam in relation to the surface, the scanning head 12 can be moved two-dimensionally over the card-shaped storage medium. However, this requires an additional mechanical expenditure in the reading device.

Figure 3:
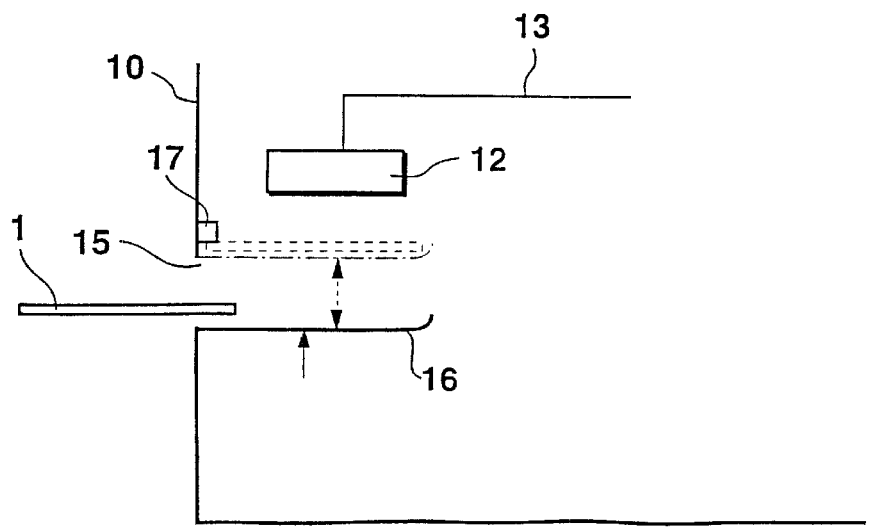
FIG. 3 shows an embodiment of the reading device.

FIG. 3 shows a reading device 10 for the optical storage card 1. It has an opening 15 and a receptacle 16. The stop 17 is installed on the housing. The scanning head 12 emits data by way of the signal output 13. The storage medium 1 is inserted into the opening 15 of the reading device. A suitable mechanism must receive and fix the storage card there so that a definite distance is assured between the surface of the storage medium 1 and the scanning head 12. A variety of known embodiments can be used for this which are already known from chip card reading devices. For example, the storage card 1 is received by a receptacle 16 in the reading device. This receptacle 16 moves upward until reaching a stop 17. In this position, the storage card is fixed in relation to the scanning head. In order to withdraw the card 1, the receptacle is lowered and an eject mechanism is used, as is also known from chip card reading devices.

What is claimed is:

1. A reading device for reading a plate-shaped optical storage medium, the reading device comprising means forming an opening for receiving a storage medium; a scanning head with a laser diode for scanning an optical surface of the storage medium; focusing means for focusing a laser beam emitted by said scanning head onto the surface of the storage medium; a detector for detecting a reflected laser beam, said opening being formed so as to receive the storage medium in credit card format, so that the storage medium is secured at a definite distance from said scanning head; and an optical deflection device which causes the laser beam emitted by said scanning head to follow a track of the storage medium, while said optical storage medium and said scanning head are immovable.

2. A reading device as defined in claim 1, wherein said optical deflection device is formed so as to cause the laser beam of the laser diode to follow the track of the storage medium.

3. A reading device as defined in claim 1, wherein said optical deflection device has at least one movable mirror which causes the laser beam of the laser diode to follow the track of the storage medium.

4. A reading device as defined in claim 1, wherein said optical deflection device includes at least one electro optical component which causes the laser beam of the laser diode to follow the track of the storage medium.

\* \* \* \* \*